J. B. CLINE.
MOLDING MACHINE.
APPLICATION FILED SEPT. 20, 1913.

1,200,586.

Patented Oct. 10, 1916.
4 SHEETS—SHEET 3.

WITNESSES:
N. R. Manning
W. J. Reiter

INVENTOR.
J. B. Cline
BY P. F. Dodge
ATTORNEY.

UNITED STATES PATENT OFFICE.

JOHN B. CLINE, OF DES MOINES, IOWA, ASSIGNOR TO THE AMERI-CONE COMPANY, OF DES MOINES, IOWA.

MOLDING-MACHINE.

1,200,586.      Specification of Letters Patent.      Patented Oct. 10, 1916.

Application filed September 20, 1913. Serial No. 790,873.

*To all whom it may concern:*

Be it known that I, JOHN B. CLINE, a citizen of the United States, and a resident of Des Moines, county of Polk, and State of Iowa, have invented a new and useful Improvement in Molding-Machines, of which the following is a specification.

This invention relates to casting or molding machines designed more particularly for forming so-called "ice cream cones"; that is, conical receptacles formed of batter or like material and adapted to hold a quantity of ice cream or similar confection.

The invention consists of mechanism of improved form and construction by means of which the cones may be produced expeditiously in large numbers, of uniform structure and form, and under proper sanitary conditions.

Mechanism embodying my invention comprises in its preferred form, a series of forming molds to receive the molding material, and each consisting of separable sections, a series of cores adapted to enter the molds to cause the material to completely fill the same and partake of the hollow shape of the molds, and a holder to contain a supply of the molding material to be introduced into the molds, the said parts being so constructed and arranged, as will be more fully described hereinafter, that the holder may be moved to a position over the molds, and operated to supply a predetermined measured quantity of material to each mold, and then moved away again, the cores entered into the molds to cause the material to fill the molds, the cores removed on the completion of the molding operation, and finally the separable sections of the molds opened to discharge the completed "cones." The foregoing parts embody various detailed features of form and construction adapted for coöperative action as will be more fully described hereinafter, which features of construction are of the form I prefer to adopt, and which in practice have been found to answer to a satisfactory degree the ends to be attained. It will be manifest however to those skilled in the art, that these details may be variously modified and changed without departing from the limits of my invention; and further it will be understood that the invention is not limited to any particular form or construction of the parts except in so far as such limitations are specified in the claims.

In the accompanying drawings: Fig. 6 is a vertical sectional elevation on an enlarged scale through one of the molds and its core. Fig. 6$^a$ is a similar view showing the parts in a different position. Fig. 7 is an elevation of the core detached. Fig. 8 is a horizontal sectional plan view on the line $b$—$b$ of Fig. 6. Figs. 10 and 11 are similar views showing the lever in its different positions in operating the core frame.

Figures 1, 12:
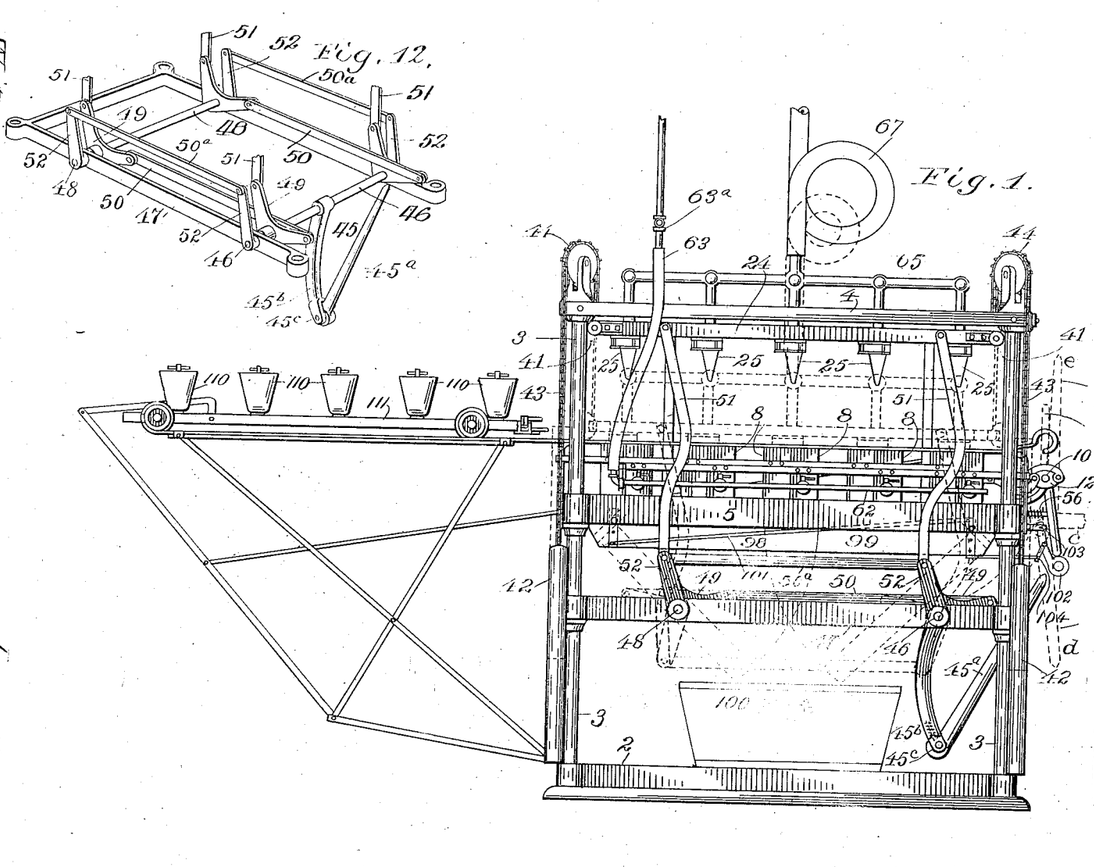
Figure 1 is a side elevation of my improved mechanism.
Fig. 12 is a perspective view of the cone frame operating mechanism.
Figure 2:
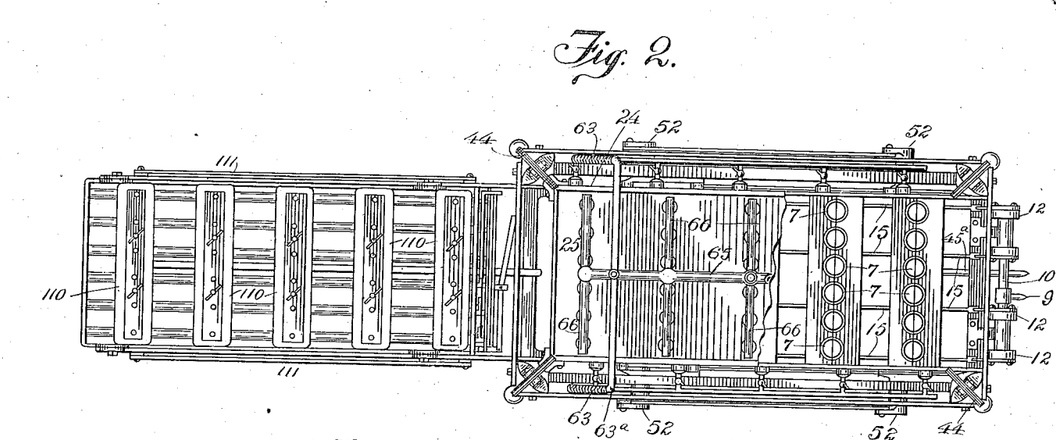
Fig. 2 is a top plan view of the same with certain parts broken away to expose other parts to view.
Figure 3:
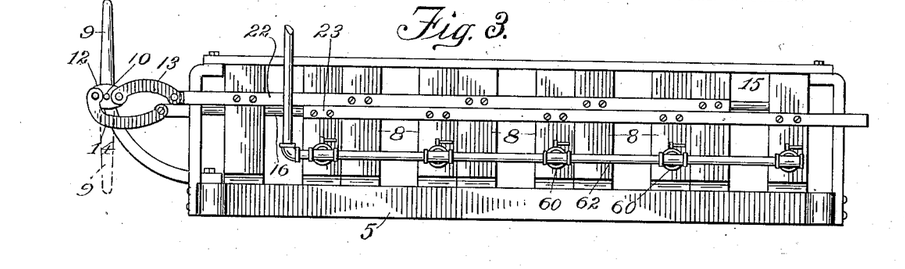
Fig. 3 is a side elevation of a number of groups of molds showing the mold sections separated.

Referring now to the drawings: Referring particularly to Figs. 1 and 2, 1 represents a main supporting frame in which the operative parts of my improved apparatus are mounted. This frame comprises a flat rectangular base 2, from the four corners of which, posts 3, 3, 3, 3, rise, which posts are connected together at their upper ends by frame bars 4, 4, 4, 4, and give support between their ends to a horizontal rectangular frame 5. The frame 5 consists of two side bars and two end bars which bars are rigidly connected together at their ends to constitute a single rigid frame structure, which is formed at its four corners with openings through which the corner posts 3, respectively extend, and to which the frame 5 is fixedly fastened in any suitable and appropriate manner. The frame 5, gives support to several groups of conical molds, 7, 7, etc., five groups in the present instance, with six molds in each group. Each group of molds is made up of two complementary members 8, 8, which extend transversely across the frame 5 and are slidingly supported at their outer ends on the side bars of the frame. These members are each in the form of a channel bar, and the two channel bars are arranged with their vertical faces adjacent to each other, and their open portions outwardly, which open portions are covered by plates 7ª more fully described hereinafter. The vertical faces of the two channel bars are formed at intervals with semiconical recesses sloping inwardly from top to bottom, so that when the two bars are brought together with their vertical faces in contact, a series of conical mold cavities will be formed, circular in cross section, with their larger ends at the top, and each made up conjointly by the opposing semiconical recesses in the faces of the channel bars. As shown more particularly in Fig. 4, the pairs of channel bars are arranged with a space between each pair, so that room will be afforded for the separation of the bars of each pair when the molds are to be opened to discharge their contents. These movements of the bars are effected simultaneously by the operation of a hand lever 9 (see Figs. 2, 3 and 4) which is fixed to a horizontal transverse rock shaft 10 mounted in bearings extending forwardly from the front end bar of the frame 5. At intervals, the rock shaft has fixed to it, four elongated heads or disks 12, to each of which are jointed at diametrically opposite sides thereof, the inner ends of two links, an upper link 13 and a lower link 14. The four upper links are jointed at their outer ends respectively to four upper rods 15, 15, 15, 15, extending longitudinally of the frame 5, and through the several channel bars 8. The four lower links are likewise jointed at their outer ends respectively to four lower rods 16, 16, 16, 16, arranged below the upper rods, and extending longitudinally of the frame loosely through the channel bars. The upper rods are connected to the right hand channel bars of the pairs, while the lower rods are connected to the left hand channel bars of the several pairs, so that by the movement of the two sets of rods in opposite directions by the hand lever 9, the channel bars of the pairs will be separated from each other, or brought together, according to the direction of movement. For instance in Fig. 3 the several pairs are shown separated from each other, which is the open position of the molds, and the lever 9 is shown extending upwardly. To move the channel bars together to close the molds, the lever is turned downwardly to the position shown by dotted lines in Fig. 3, by which movement the upper rods 15 will be drawn to the left and the lower rods 16 will be thrust to the right, the right hand bars of the several pairs by this action being drawn to the left, and the left hand bars of the pairs being forced to the right, with the result that the molds will be closed. As a convenient manner of connecting the rods to the respective channel bars, I employ spacing spools 18 and 19 on the respective upper and lower rods. The spools of the upper rods engage at their ends the right hand channel bars of the pairs, and slide freely through the left hand channel bars; while the spools of the lower rods engage at their ends, the left hand channel bars of the pairs and slide freely through the other bars. By this arrangement the spools of the upper rods form a connection of said rods with one of the bars of each pair, and afford guides for the other bars; while the spools of the lower rods form a connection of said rods with the channel bars which move on the other rods, and afford guides for the other channel bars. At their rear ends the upper rods are provided with nuts 20 which bear against the right hand channel bars of the rearmost pair, by means of which nuts the several spools and channel bars which they engage, may be clamped firmly together and maintained in their proper fixed positions on the rods. Likewise the lower rods are provided on their rear ends with nuts 21 engaging the ends of the rearmost spools, which in turn engage the left hand channel bar of the rearmost pair, these nuts serving to clamp the spools and channel bars which they engage, endwise on the rods and thus maintain them in their proper relatively fixed positions thereon.

In order that the channel bars of the several pairs may be properly alined when they are in contact to close the molds, I provide at opposite ends of the channel bars, alining rails 22 and 23 arranged one above the other, the upper rail being firmly fixed to the ends of the left hand channel bars of the several pairs, and the lower rail being firmly fixed to the right hand bars of the pairs. The two rails fit closely together edge to edge in such manner that in the back and forth movements of the channel bars to open and close the molds, the rails will slide on each other and will act to maintain the bars in such relative positions as to cause the recesses therein to properly aline when the channel bars are in contact.

Figures 6, 6A, 7, 8, 10, 11:
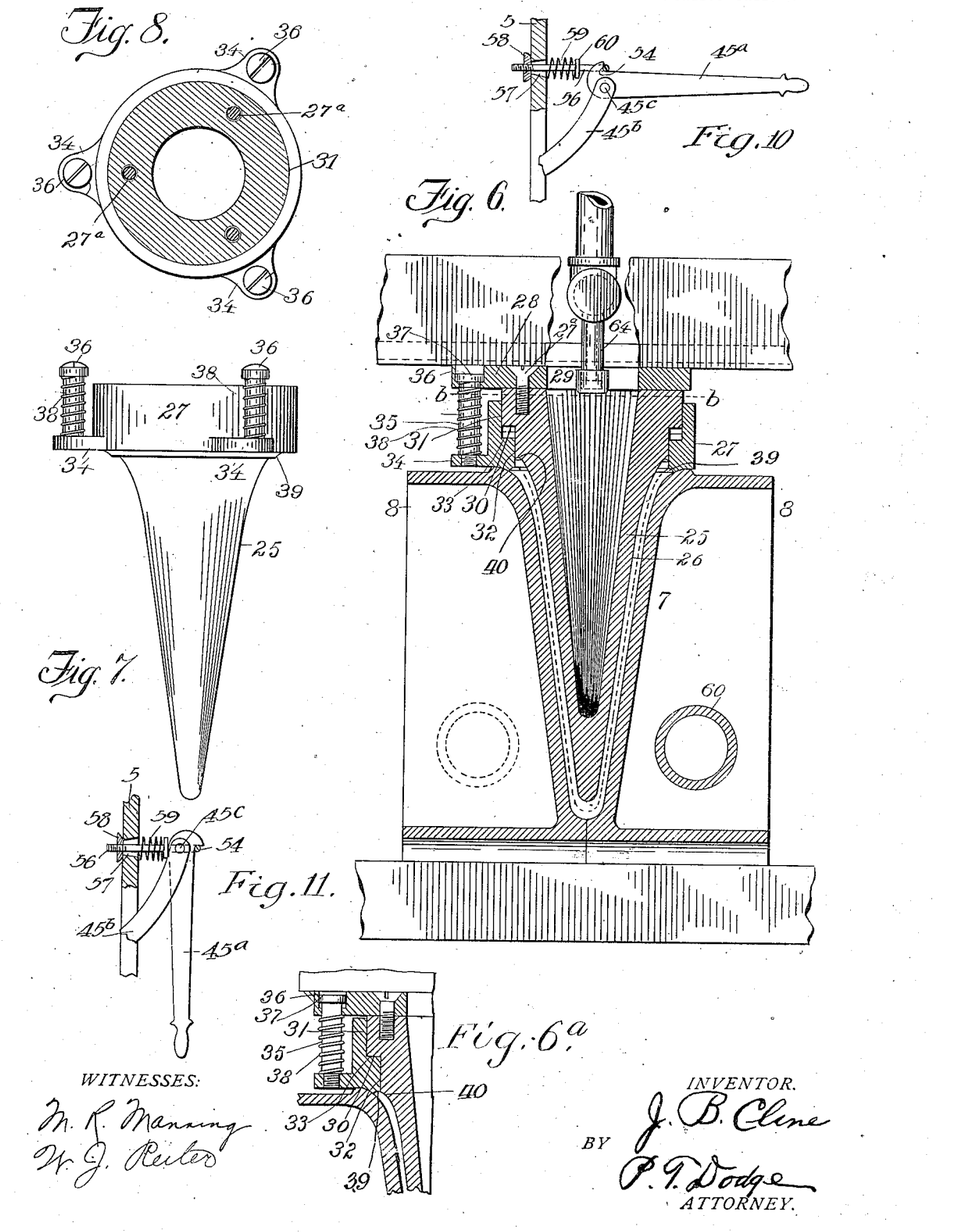

Movable up and down above the molds, is a rectangular horizontal frame 24 from the under side of which depends a number of conical mold cores 25, 25, etc., which are arranged in groups corresponding with the several groups of molds, and which cores are adapted, when the frame 24 is lowered, to enter the respective molds as shown more particularly in Fig. 6, and cause the molding material, previously supplied to the molds, to properly fill the conical space between the interior of the molds and the exterior of the cores. Each of the cores consists of a fixed hollow conical body or core proper 26, and a surrounding relatively movable stripping ring 27 which surrounds the upper enlarged end of the core, and whose function is to hold the formed cone down momentarily in the mold, when the core is first withdrawn, so that the cone will be stripped from the core and prevented from adhering thereto, and will be compelled to remain in the mold until the latter is opened to discharge it. At its upper end the core proper 26, is cylindrical in cross section and is fastened, by means of screws 27ª, to the under side of a transverse plate 28 containing openings 29, one for each core of the group, which plate is in turn fastened to the under side of the frame 24 in any suitable manner, there being one plate for each group of cores. The cylindrical portion of the core is reduced in diameter some distance below its upper extremity, thus forming an annular shoulder 30, and the stripping ring is formed on its interior with an enlarged cylindrical bore 31, and a reduced bore 32, which bores surround respectively the two cylindrical portions of the core proper, the stripping ring being further provided with an annular shoulder 33 at the junction of the two bores, which shoulder coöperates with the shoulder 30 on the core, in limiting the movement of the stripping ring relatively to the core. The stripping ring is provided with three laterally extending ears 34, 34, 34, from which extend upwardly, guiding pins 35, 35, provided on their upper ends with heads 36, seated in sockets 37, 37, etc., in the plate 28. These pins are surrounded by spiral springs 38, whose upper ends bear against the under side of the plate 28, and whose lower ends bear against the upper sides of the ears 34, the tendency of the springs being to urge the stripping ring downwardly relatively to the core proper to the position shown in Fig. 6. On reference to this figure it will be seen that the lower end of the stripping ring is formed with an annular curved surface 39, which, when the ring is moved upwardly on the core proper, with the two annular shoulders in contact, will form a continuation of the upper end 40 of the conical portion of the core proper, and will close the upper end of the conical space between the interior of the mold and the exterior of the core. As a result of this construction, when the core is withdrawn, owing to the relative movement between the pins 35 and the plate 28, the stripping ring will be held down by the springs to the position as shown in Figs. 6 and 6ª, and the annular curved surface 39 on the ring will be engaged with the upper end of the formed cone, and will thus prevent the same from being drawn out of the mold with the retracted core, the result being that the core will free itself from the formed cone and leave the latter seated in the mold. Normally when the frame 24 is in its raised position, with the cores removed from the molds, the position of the stripping ring will be as shown in Fig. 6 that is, the ring will be projected relatively to the core and will be held downwardly by the springs. When the frame is lowered, the cores will enter the molds, and the stripping rings will come into engagement with the upper edges of the molds, the cores not yet being fully seated in the molds. In this position of the parts, the steam caused by the contact of the heated cores with the molding material in the molds, will be allowed to escape from between the contacting surfaces of the molds and the stripping rings. On the further downward movement of the frame 24, the cores will be advanced into the molds to their full extent, the plate 28 sliding down on the pins 35 and compressing the springs 38, and the parts will finally come to rest in the position shown in Fig. 6ª, where it will be seen that the annular curved surface 39 on the stripping ring, forms a continuation of the upper end of the conical surface of the core, and completely closes the upper end of the conical molding space.

The frame 24 is guided in its up and down movements by means of four pairs of rollers 41, 41, one pair journaled at each corner of the frame on angularly related horizontal axes, with the rollers of each pair bearing against the sides of the respective posts 3 before alluded to, by which means the frame in its movements up and down will be prevented from lateral or longitudinal displacement. The frame is counter balanced in its movements by means of counterbalancing weights 42, 42, etc., which slide up and down at the outer sides of the posts 3, and which are connected with the frame by means of sprocket chains 43, 43, etc., attached at one end to the weights, and at their opposite ends to the frame at the corners of the same, which chains pass over upright sprocket wheels 44, 44, etc., mounted in suitable bearings on the respective posts 3. As a result of this manner of guiding the frame 24 it will be caused to move uniformly and evenly and all of the cores will accurately enter the molds in the same relative positions, whereby the molded cones will all be of the same thickness and structure.

The up and down movements of the frame 24 to enter the cores in the molds and withdraw the same, are controlled manually by means of a hand lever 45 shown more particularly in Figs. 1, 2, 9 and 12. This hand lever is in the form of two members, an outer one 45ª having a handle for operating the lever, and an inner one 45ᵇ which is jointed at its outer end, as at 45ᶜ, to the inner end of the outer member as will be more fully described hereinafter, and is fixed at its inner end to a horizontal rock shaft 46 mounted in suitable bearings near the front ends of fore and aft frame bars 47, 47, fixed to the corner posts 3. In rear of the shaft 46 there is mounted in the frame bars 47, a second shaft 48 parallel to shaft 46. Fixed to the shafts 46 and 48 at the opposite ends of the same, and at the inner sides of the frame bars 47, are elbow levers 49, 49, etc. One of the arms of each forward elbow lever is connected with the corresponding arm of the rear elbow lever, by means of fore and aft links 50, 50 whereby when shaft 46 is rocked, the said elbow levers are caused to move in unison. The other arms of the elbow levers are connected by means of upright links 51, 51, etc., with the frame 24 on opposite sides of the latter. In order that the links 50 and the elbow lever arms, to which they are jointed may be caused to pass dead center, crank arms 52, 52, etc., are connected with the ends of the shafts 46 and 48 at the outer sides of the frame bars 47, which crank arms extend at right angles to the arms of the elbow levers to which the links 51 are jointed, and which front and rear crank arms are connected together by horizontal links 50ª jointed at their ends to the ends of said crank arms as shown in Fig. 12. As a result of this construction, when the rock shaft 46 is rocked upwardly and rearwardly by the hand lever, the elbow levers will be rocked rearwardly and will positively lower the frame 24 to the position shown by dotted lines in Fig. 1; and when the rock shaft is rocked in the opposite direction, the elbow levers will be rocked forwardly and the frame will be elevated to the full line position shown in Fig. 1.

The parts described are so formed and related that the elbow levers will move through approximately 180° in moving the core frame 24 its full stroke upwardly or downwardly, and when the frame is elevated, the upright links 51 will be substantially in vertical alinement with the arms of the elbow levers to which they are attached, with the result that the core frame will be supported and held in elevated position by the links.

Figure 4:
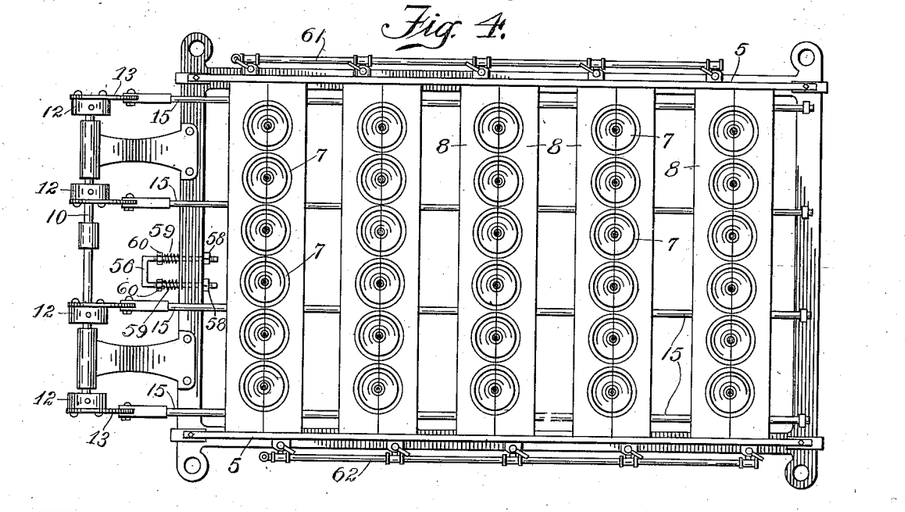
Fig. 4 is a top plan view of the same showing the mold sections closed.
Figure 5:
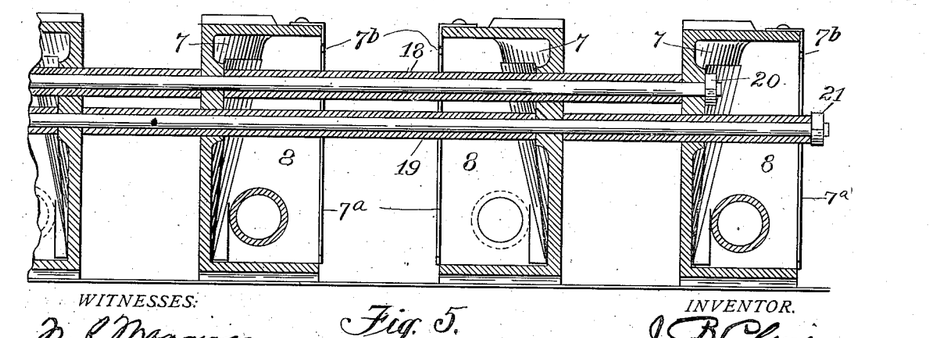
Fig. 5 is a vertical sectional elevation on an enlarged scale through two of the groups of molds, the sections of the molds being shown separated from each other.
Figure 9:
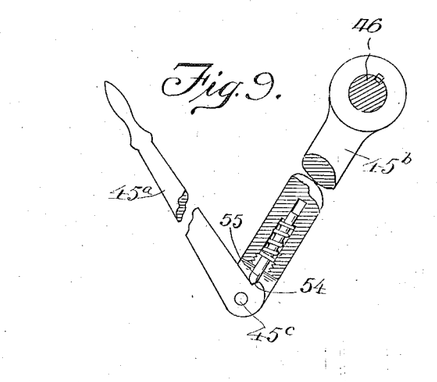
Fig. 9 is a detail view of the lever for operating the core frame.

As shown in Fig. 9 the outer member of the hand lever is formed adjacent the point where it is pivoted to the inner member, with a shoulder 54 against which the outer rounded end of a spring pressed pin 55 engages, which pin is mounted in the inner member of the lever, and which acts, when so engaged, to hold the parts of the lever yieldingly in the position shown in Fig. 9, with the inner member extending downwardly, and the outer member extending upwardly therefrom within convenient reach of the attendant. In this position of the lever, the core frame 24 will be held elevated as shown in Fig. 1. This lever in its movements in raising and lowering the core frame, is adapted to coöperate with a stirrup 56 which, as shown in Figs. 1 and 4, extends forwardly from the front end bar of the frame 5, and is pivotally mounted, so that its outer free end may move to a limited extent up and down for the purpose presently to be described. This stirrup has its two legs extending rearwardly through flared vertical slots 57, 57, in the frame bar, and it is provided with adjusting nuts 58, 58, screwed on the rear ends of the legs to retain the stirrup in place and to admit of its being adjusted to a greater or less extent beyond the frame bar as conditions may require. The legs of the stirrup are encircled by spiral springs 59, 59, which bear at their rear ends against the frame bar and at their opposite ends against heads 60, 60, on the respective legs, the action of the springs being to maintain the stirrup yieldingly in a horizontal projected position, while permitting it to rock up and down in the vertical slots. This stirrup forms a fulcrum for the hand lever in the rocking movements of the shaft 46 to enter the cores in the molds; and it also serves to lock the lever down in position when the cores are fully entered in the molds. These operations are effected in the following manner. Assuming the parts to be in the position shown in Fig. 1, the lever member 45ª is drawn upwardly and turned to the dotted line position indicated by the letter "c" in Fig. 1. In this action of the lever, the outer member 45ª will be moved relatively to the inner member on the connecting axis, and by such relative movement, the spring pin 55 will be pushed back by the shoulder 54, and the latter will be engaged with the outer end of the stirrup, as shown in Fig. 10. By such movement of the lever, the shaft 46 will be rocked upwardly, and the elbow levers rocked rearwardly, with the result that the core frame will be positively moved downwardly and the cores entered into the molds to the position shown in Fig. 6, where it will be seen that the stripper ring is in contact with the mold, but the core is held a slight distance above its final position by the springs 38. With the cores thus partially entered, the steam from the heated molding material is given opportunity to escape as before mentioned. The outer member of the lever is now turned down to the dotted line position indicated by the letter "d" in Fig. 1, in which action, the lever member will fulcrum on the end of the stirrup seated against the shoulder 54, and as the outer lever member is moved down, the inner member will move inwardly as shown in Fig. 11, and will act to rock the elbow levers still farther rearwardly, with the result that the core frame will be lowered still farther. The cores will be given their final movement into the molds against the action of the spiral springs 38, compressing the latter, and the parts come into rest with the shoulders 30 and 33 on the core and stripper ring respectively. in contact as shown in Fig. 6ª. After the molding material has been sufficiently baked and hardened, the hand lever is raised to the dotted line position indicated by the letter "c", with the result that the cores will be slightly withdrawn, while the stripper ring remains down in contact with the molds, thus preventing the molded cones from sticking to the cores. The lever member is then raised to a vertical position indicated by the dotted lines "e", and finally pushed down to its original position, which action will rock the shaft 46 downwardly and the elbow levers forwardly, and will raise the core frame to its former elevated position, the spring pin 55 being projected into engagement with the shoulder 54, in which position it will act to retain the lever member in its upwardly extending position ready to be grasped by the operator for another operation.

Situated in the several channel bars 8, are perforated heating burner tubes 60, 60, etc., supplied with gas or other suitable heating medium by means of supply pipes 61 and 62 extending in a fore and aft direction at opposite sides of the machine, the supply pipe 61 communicating with the burner tubes 60 of one set of the channel bars, and the supply pipe 62 communicating with the burner tubes 60 of the other set of bars. These supply pipes are connected by flexible piping 63, 63, with a common transverse pipe 63ª which is connected with a suitable source of gas supply, the flexible connections permitting of the movements of the channel bars in opening and closing the molds. The cores 26 are heated by suitable burners 64 which extend downwardly from the frame 24, into the upper ends of the hollow cores, through the openings in the plates 33. These burners are supplied with gas, or other suitable heating medium, through a main fore and aft extending supply pipe 65, and laterally extending branch pipes 66, connecting with the respective burners, the main supply pipe being connected by a suitable flexible pipe 67 with the source of gas supply.

The plates 7ª before referred to as covering the open portions of the channel bars 8, serve to equalize and distribute the heat from the burner tubes 60, and at their lower ends the plates terminate just above the lower flanges of the channel bars, so as to leave a contracted space for the entrance of air, while near their upper ends the plates are perforated as at 7ᵇ for the escape of the products of combustion.

The holder for the molding material consists of a series of transverse tanks 110, etc., corresponding in number to the groups of molds, which tanks are mounted in a rectangular carriage or frame 111 movable from a position beyond the main frame of the machine as shown in Fig. 1 to a position within said frame, with the tanks over the respective groups of molds, in which position of the tanks the molds may be filled with the material therefrom. As this mechanism for supplying the molds is not claimed in the present invention, further description of the same will be unnecessary.

In order that the formed cones may be received from the molds when the latter are opened, I provide beneath the molds, receiving pans 98 and 99 which are pivoted at their outer ends respectively near the opposite ends of the frame 5, on horizontal transverse axes, so that when in horizontal position the inner ends of the pans will meet, and when swung on their axes, the pans will separate and extend at a downward inclination as shown by dotted lines in Fig. 1 in which position of the parts, the cones received by the pans from the molds will slide downwardly and be discharged into a receiving receptacle 100. In order that the pans may be made to move in unison, they are connected at their outer ends by means of a connecting rod 101 which is jointed to one pan below its axial connection with the frame, and to the other pan above its axial connection with the frame. The pans are operated by means of a hand lever 102 pivoted to the forward end of the frame 5 on the transverse axis 103, and having jointed to it a rod 104 fixed to the outer end of the forward pan, the construction being such that when this lever is pulled upwardly, it will rock the forward pan downwardly on its axis, and by reason of the connection of the forward pan with the rear pan, the latter will be moved in like manner to the position shown by dotted lines in Fig. 1.

The operation of the mechanism described is as follows: With the several parts in the position shown in Fig. 1, with the tanks supplied with molding material, and the heating burners lighted, the operator draws the carriage 111 with the tanks thereon, inwardly on the tracks within the main frame to a position where the several tanks will be vertically over the several groups of molds, and the several molds are charged with the molding material. The cores are entered in the molds by the operation of lever 45 in the manner hereinbefore described. When the cones have been properly baked, the lever 45 is raised and then returned to its former position, which action will result in the full withdrawal of the cores from the molds and the elevation of the cores to their former raised position. It now only remains to discharge the formed cones from the molds, which is accomplished by turning lever 9 upwardly from the dotted to the full line position of Fig. 3. This movement of the lever will separate the pairs of channel bars forming the mold cores, and the formed cones will fall into the receiving pans 98 and 99, which being tipped downwardly by hand lever 102, will discharge the cones into the receiving receptacle 100. Lever 102 is then moved back to raise the pans to their normal receiving position, and lever 9 is again turned down to its former position to close the molds, whereby the several parts of the machine will be in position ready for another operation.

Having thus described my invention what I claim is:

1. In a machine of the type described, the combination of a main frame, molds sustained thereby, a core frame mounted in the main frame for movement up and down to and from the molds, and provided with mold cores, elbow levers mounted in the main frame near the front, elbow levers mounted in said frame near the rear, the said elbow levers being so sustained that when the core frame is in an elevated position, one of the arms of the elbow levers will extend in an upright position, and the other arms in a horizontal position, links connecting the horizontal arms of the elbow levers with each other, vertical links connecting the upright arms of the elbow levers with the core frame, and means for rocking said elbow levers to respectively raise and lower the frame, the relation of the elbow-levers and links being such that when the frame is in elevated position, the upright arms of the elbow levers, will extend in line with the vertical links, and will positively maintain the frame supported in an elevated position.

2. In a machine of the type described, the combination of a main frame, molds supported thereby, a core frame mounted for movement in the main frame to and from the molds and provided with mold cores, front and rear rock shafts mounted in the main frame, a pair of elbow levers on the front shaft, a pair of elbow levers on the rear shaft, the arms of said front and rear elbow levers being parallel with each other, fore and aft links connecting said parallel arms with each other, upright links jointed at their upper ends to the core frame and at their lower ends to the arms of the elbow levers, crank arms on the said front and rear shafts, fore and aft links connecting the crank arms on the front shaft with the crank arms on the rear shaft, the relation of the elbow levers and upright links being such that when the frame is in elevated position the upright arms of the elbow levers will extend in line with the upright links and will positively maintain the frame supported in an elevated position, and an operating handle connected with the front rock shaft.

3. In a machine of the type described, the combination of a main frame, molds sustained thereby, a core frame mounted for movement to and from the molds and provided with mold cores, a rocking member for moving the core frame to seat the cores in the molds, a hand lever for actuating the rocking member, said hand lever comprising an inner member connected with the rocking member and an outer member jointed to the inner member, and a device on which the outer member of the lever is adapted to fulcrum in actuating the parts to seat the cores fully in the molds.

4. In a machine of the type described, the combination of a main frame, molds sustained thereby, a core frame mounted for movement in said main frame to and from the molds and provided with mold cores, a rocking member for moving the core frame toward the molds, a hand lever for actuating the rocking member, said hand lever comprising an inner member connected with the rocking member, and an outer member jointed to the inner member, and provided with a shoulder and a stirrup pivoted to the main frame and adapted to be engaged by said shoulder and to form a fulcrum for the outer member of the lever in moving the core frame to fully seat the cores in the molds.

5. In a machine of the type described, the combination of a mold, a core adapted to enter therein, and a stripping ring sustained by the core and movable relatively thereto to strip the casting from the core, said ring being adapted when the core is entered in the mold to engage and close the upper end of the same, and being in position to be engaged by the core and thereby limit the degree of penetration of the core in the mold.

6. In a machine of the type described, the combination of a mold, a core adapted to enter therein and provided with an annular shoulder, a stripping ring surrounding the core and movable relatively thereto and provided with an annular shoulder adapted to engage with the shoulder on the core, said ring being adapted when the core is entered in the mold to engage and close the upper end of the same and said shoulders adapted when the core is entered in the mold to engage each other and limit the degree of penetration of the core.

7. In a machine of the type described, the combination with a series of molds, of a series of cores adapted to enter therein, a stripping ring sustained by each core and each ring being movable independently of the others relatively to their respective cores to strip the castings therefrom.

8. In a machine of the type described, the combination of a main frame, pairs of mold bars mounted therein and provided each with openings extending therethrough between their ends, the bars of a pair being movable to and from each other, actuating rods extending through the openings in said bars and being connected respectively to one bar of each pair, and means for moving said actuating rods endwise in opposite directions relatively to each other to cause the bars of a pair to approach or recede from each other.

9. In a machine of the type described, the combination of a main frame, a series of pairs of mold bars mounted therein with the bars of a pair movable to and from each other, said mold bars being each provided with openings extending therethrough between their ends, two series of actuating rods extending through said openings, one series of rods being connected to one of the bars of each pair, and the other series of rods being connected to the other bar of each pair and means for moving said two series of rods endwise in opposite directions relatively to each other.

10. In a machine of the type described, the combination of a main frame, a series of pairs of mold bars mounted therein, with the bars of a pair movable to and from each other, two rods extending through all of the bars, spacing spools encircling one of the rods and extending between the right hand bars of the pairs and loosely through the left hand bars, spacing spools encircling the other rod and extending between the left hand bars of the pairs and extending loosely through the said right hand bars, and means for moving said rods endwise relatively to each other.

11. In a machine of the type described, the combination of a main frame, a series of mold bars mounted therein and separable from each other to discharge the contents of the molds, receiving pans pivoted at their outer ends to swing downwardly and adapted to be held in horizontal receiving position, and means for swinging the pans downwardly to discharge their contents.

In testimony whereof I hereunto set my hand this 13" day of Sept., 1913, in the presence of two attesting witnesses.

JOHN B. CLINE.

Witnesses:
L. E. STEVENS,
B. B. COPE.